US009388296B2

(12) United States Patent
Chen et al.

(10) Patent No.: US 9,388,296 B2
(45) Date of Patent: Jul. 12, 2016

(54) CROSSLINKED POLYETHYLENE COMPOSITION HAVING IMPROVED PROCESSABILITY

(75) Inventors: Xuelian Chen, Beijing (CN); Wenbin Liang, Beijing (CN); Yanhua Niu, Beijing (CN); Shih-yaw Lai, Beijing (CN)

(73) Assignees: National Institute of Clean-and-Low-Carbon Energy, Beijing (CN); Shenhua Group Corporation Limited, Beijing (CN)

( * ) Notice: Subject to any disclaimer, the term of this patent is extended or adjusted under 35 U.S.C. 154(b) by 0 days.

(21) Appl. No.: 14/405,220

(22) PCT Filed: Jun. 4, 2012

(86) PCT No.: PCT/CN2012/076437
§ 371 (c)(1),
(2), (4) Date: May 5, 2015

(87) PCT Pub. No.: WO2013/181784
PCT Pub. Date: Dec. 12, 2013

(65) Prior Publication Data
US 2015/0291774 A1     Oct. 15, 2015

(51) Int. Cl.
| C08K 5/36 | (2006.01) |
| C08F 10/02 | (2006.01) |
| C08K 5/14 | (2006.01) |
| C08K 5/00 | (2006.01) |
| C08K 5/3492 | (2006.01) |
| C08K 5/16 | (2006.01) |
| C08L 23/08 | (2006.01) |

(52) U.S. Cl.
CPC .............. C08K 5/36 (2013.01); C08K 5/0025 (2013.01); C08K 5/14 (2013.01); C08K 5/34924 (2013.01); C08K 5/16 (2013.01); C08L 23/08 (2013.01)

(58) Field of Classification Search
CPC ........ C08K 5/36; C08K 5/14; C08K 5/34924; C08F 10/02
See application file for complete search history.

(56) References Cited

U.S. PATENT DOCUMENTS

| 3,079,379 A | 2/1963 | Tanaka et al. |
| 3,214,422 A | 10/1965 | Mageli et al. |
| 3,876,613 A | 4/1975 | Needham et al. |
| 3,974,114 A | 8/1976 | Sowa |
| 4,029,729 A | 6/1977 | Rees et al. |
| 4,115,508 A | 9/1978 | Hughes |
| 4,267,080 A | 5/1981 | Yokoyama et al. |
| 5,245,084 A | 9/1993 | Groepper et al. |
| 5,260,381 A | 11/1993 | Needham |
| 5,292,791 A | 3/1994 | Groepper et al. |
| 5,367,025 A | 11/1994 | Needham |
| 5,849,214 A * | 12/1998 | Novits ................. C08K 5/0025 252/182.17 |
| 5,856,412 A | 1/1999 | Bock et al. |
| 5,896,412 A | 4/1999 | Levanon et al. |
| 6,180,706 B1 * | 1/2001 | Keogh ................. C08K 5/0025 174/110 PM |
| 6,555,019 B2 | 4/2003 | Palys et al. |
| 6,864,323 B2 | 3/2005 | Schlosser et al. |
| 7,056,967 B2 | 6/2006 | Voigt et al. |
| 7,825,059 B2 | 11/2010 | Meijer et al. |
| 7,842,759 B2 | 11/2010 | Esseghir et al. |
| 7,943,694 B2 | 5/2011 | Varnhorn et al. |
| 2001/0002075 A1 * | 5/2001 | Chaudhary ............. C08J 3/226 264/51 |
| 2001/0003075 A1 | 6/2001 | Nagayasu |
| 2002/0177671 A1 | 11/2002 | Palys et al. |
| 2004/0127610 A1 * | 7/2004 | Russell ................. C08K 5/526 524/115 |
| 2009/0020749 A1 * | 1/2009 | Jager ..................... C08F 210/02 257/40 |

(Continued)

FOREIGN PATENT DOCUMENTS

| CN | 1580113 A | 2/2005 |
| CN | 1974650 A | 6/2007 |
| CN | 101107297 A | 1/2008 |
| CN | 101134826 A | 3/2008 |
| CN | 101284911 A | 10/2008 |

(Continued)

OTHER PUBLICATIONS

Crawford, R.J., et al., "Rotational Molding Technology," 2001, Plastics Design Library, William Andrew Publishing, Norwich, New York, pp. 2-13.

(Continued)

*Primary Examiner* — Mark Kaucher
(74) *Attorney, Agent, or Firm* — Senniger Powers LLP (57) ABSTRACT

Disclosed in the present invention is a crosslinked polyethylene composition having improved processability comprises: 100 parts by weight of polyethylene, 0.03-5 parts by weight of crosslinking agent, 0.03-5 parts by weight of crosslinking promoter, and 0.01-1.5 parts by weight of free radical inhibitor, wherein the polyethylene is a copolymer and/or homopolymer containing at least 90 wt. % of vinyl and at least one $C_3$-$C_8$ α-alkenyl, and has a density in the range of 0.920-0.970 g/cm³, a melt index in the range of 2.5-17.5 g/10 min; the crosslinking agent is a peroxide crosslinking agent; the crosslinking promoter is an organic substance containing maleimido, (meth)acrylate group, and/or allyl, and/or a polymer containing more than 50% of vinyl; the free radical inhibitor is an organic antioxidant, a quinhydrone and/or a substituted quinhydrone. The crosslinked polyethylene composition of the present invention has a crosslinking efficiency index of more than 1,100 Nm/g and a δ torque value of more than 10 Nm at the temperature of 200° C., a significantly higher safety process temperature and a significantly improved crosslinking retardation time compared to the conventional crosslinked polyethylene composition, which make it especially be suitable for the production of rotational molding articles.

8 Claims, 5 Drawing Sheets

(56) References Cited

U.S. PATENT DOCUMENTS

| | | | |
|---|---|---|---|
| 2009/0030749 A1 | 1/2009 | Drummond et al. | |
| 2010/0286308 A1* | 11/2010 | Carlsson | C08K 5/13 523/216 |
| 2011/0003942 A1 | 1/2011 | Tsukui et al. | |
| 2011/0245417 A1 | 10/2011 | Mori et al. | |
| 2015/0232586 A1* | 8/2015 | Chen | C08F 10/02 525/293 |
| 2015/0291774 A1 | 10/2015 | Chen et al. | |

FOREIGN PATENT DOCUMENTS

| | | |
|---|---|---|
| CN | 101481475 A | 7/2009 |
| CN | 101525471 A | 9/2009 |
| CN | 102140193 A | 8/2011 |
| CN | 102186900 A | 9/2011 |
| CN | 102492213 A | 6/2012 |
| DE | 2553094 A1 | 8/1976 |
| DE | 2553145 A1 | 8/1976 |
| EP | 0087210 A1 | 8/1983 |
| GB | 1294154 | 10/1972 |
| GB | 1535039 A | 12/1978 |
| GB | 1535040 A | 12/1978 |
| JP | S55111116 A | 8/1980 |
| JP | 561238840 A | 10/1986 |
| JP | 624667 B2 | 1/1987 |
| WO | 2006066984 A1 | 6/2006 |

OTHER PUBLICATIONS

English Abstract CN1580113A, 1 page.
English Abstract JPS55111116A, 2 pages.
English Abstract JPS61238840A, 1 page.
Written Opinion issued Mar. 14, 2013 in PCT/CN2012/076437, 27 pages. (with English Translation).
International Search Report issued Mar. 14, 2013 in PCT PCT/CN2012/076437, 9 pages. (with English Translation).

* cited by examiner

CROSSLINKED POLYETHYLENE COMPOSITION HAVING IMPROVED PROCESSABILITY

REFERENCE TO CORRESPONDING APPLICATIONS

This application is the 371 National Stage Application based on International PCT Application No. PCT/CN2012/076437, filed Jun. 4, 2012.

FIELD OF THE INVENTION

This invention relates to a crosslinked polyethylene composition having improved processability and a crosslinking aid of the polyethylene composition, in particular, a crosslinked polyethylene composition having a significantly improved processability owning to a higher safety process temperature and/or an improved crosslinking retardation time. This invention also relates to a polyethylene composition especially suitable for the production of rotational molding articles.

BACKGROUND ART

So far polyethylene is still one of the most important materials for manufacturing articles in various shapes by extrusion molding, blow molding, injection molding, film molding, rotational molding, or other molding methods. Typical examples of articles of this kind include tube, drum, bottle, box, film, piece, etc. However, polyethylene materials having different physical properties and processabilities are required for various articles, so as to obtain qualified ones. Some special articles, for example, tube, bottle and film, require the polyethylene having not only excellent physical property and processability, but also a good balance between the physical property and the processability. Stringent requirements on the polyethylene material greatly increase difficulty in microstructure design of the polyethylene material, especially in material composition and molecular structure design.

Obviously, in all the polyethylene articles, the molding of a large and hollow article is the most difficult, particularly for the rotational molding, because the rotational molding requires a very good balance between the physical properties and the processability of a polyethylene composition. However, a lot of known polyethylene raw materials, in particular conventional crosslinked polyethylene compositions, cannot completely meet the abovementioned stringent requirements. Generally speaking, the design of the molecular structure of polyethylene determines its specific use and way of formation, because the molecular structure is immediately related to physical and mechanical properties as well as processability of the material.

As is known to all, for large and hollow articles, the best way for molding is rotational molding, because the hollow articles resulting from rotational molding are integrate and have no weld lines or joints, which, without doubt, is conducive to improvement of the physical properties of the articles. Usually, the rotational molding method comprises the following steps: (1) feeding the plastic resin powders into a hollow die; (2) heating the hollow die to melt the resin powders therein, (3) rotating the hollow die so as to take advantage of the centrifugal force to make the melted resin powders stick closely to the inner wall of the rotating hollow die, thereby achieving the molding and self-densifying; (4) cooling the hollow die and the shaped resin article therein by injecting such cooling mediums as air and/or water; (5) withdrawing the molded article from the cooled hollow die. For the details of the abovementioned rotational molding, reference can be made to "ROTATIONAL MOLDING TECHNOLOGY," 2001, pp. 2-13, as well as U.S. Pat. No. 4,029,729 and U.S. Pat. No. 4,115,508.

Rotational molding crosslinked resin articles have a series of crucial advantages, e.g., higher heat distortion temperature (HDT), higher glass transition temperature, higher strength of extension, lower heat expansion coefficient, better environmental stress cracking resistance (ESCR), good weather resistance, prominent chemical solvent resistance, etc.

A plurality of polymer resins, such as polyethylene, polycarbonate, polyamide, polyvinyl chloride and the like, can be formed by rotational molding, wherein polyethylene articles in various forms take up more than 85% of the market shares owning to their low costs, excellent processability, and good chemical erosion resistance. However, conventional polyethylene articles may be impaired to some extent by hydrocarbon, gasoline and other chemical substances, especially by esterification and/or halogenated hydrocarbon. Moreover, a poor creep resistance is another defect that limits the final use of polyethylene products. When chemical storage tanks or large or unsupported chemical storage containers need to be prepared, the occurrence of crosslinking is usually required during the formation of high-density polyethylene composition which is used for preparing articles of this kind, so as to improve properties of the final articles.

Molecular weight of a formed composition attaches great importance to processing flowability as well as overall mechanical properties of a crosslinked formed article. Polyethylene having a high flowability with the introduction of organic peroxide crosslinking agents has been reported. U.S. Pat. No. 3,876,613, U.S. Pat. No. 5,367,025, U.S. Pat. No. 4,267,080 and U.S. Pat. No. 4,029,729 disclose some crosslinked polyethylene compositions for rotational molding. In the above patent literatures, the polyethylene compositions for rotational molding are polyethylene homopolymers or copolymers having a melt index of at least 10 g/10 min, for example 20 g/10 min. However, as is known to all, the higher the melt index of the polyethylene composition is, the lower the crosslinking efficiency is, and the poorer the impact resistance and environmental stress cracking resistance (ESCR) of the final article are.

A high-density polyethylene is still greatly expected, so that a final article can be provided with a chemical erosion resistance, a tenacity and a soften temperature as high as possible. For example, U.S. Pat. No. 3,876,613 discloses a crosslinked polyethylene composition having a density in a range of 0.920-0.970 g/cm$^3$, preferably in a range of 0.940-0.970 g/cm$^3$, the chemical erosion resistance of which is extraordinary.

A crosslinking agent is usually used, enabling the occurrence of crosslinking of plastic resins, such as polyethylene compositions. An ideal crosslinking agent shall enable a polyethylene composition to have an improved crosslinking retardation time (scorch time) so as to avoid impact on formation by premature crosslinking of the composition, and to increase processability of the composition.

Crosslinking agents commonly used for crosslinking of rotational molding polyethylene compositions are various organic peroxides. However, the decomposition of most peroxide crosslinking agents begins before the temperature of about 150° C., and ends at the temperature of about 180° C. The decomposition temperature of the above peroxide crosslinking agents is so low that premature crosslinking happens before a composition formed by the crosslinked polyethylene becomes compact or during its formation, hence, the effect of the crosslinking agents is unsatisfactory.

To resolve the technical problem of premature crosslinking of the rotational molding polyethylene composition, one solution is to add an aid to a crosslinked polyethylene composition using a peroxide as crosslinking agent to improve the crosslinking retardation time. U.S. Pat. No. 7,842,759, U.S. Pat. No. 7,056,967 and U.S. Pat. No. 6,864,323 disclose several free radical inhibitors, but the polyethylene compositions disclosed thereby are polyethylene composition for use in wires or cables, having extremely low melt indexes, for example, lower than 1.0 g/10 min. For instance, nitroxides and 1,1-diphenylethene are used in these reference documents as free radical inhibitors for delaying crosslinking, and the resin compositions using these inhibitors are formed by extrusion to be used for preparation of wires, cables and tubes.

It is known that hydroquinone and antioxidants can be used as crosslinking retarders for crosslinked resin compositions which employ peroxides as crosslinking agents. However, the addition of hydroquinone and antioxidants deteriorate δ(delta) torque value, which make the final properties of the cured article worse. As to the technical details hereinabove, reference can be made to U.S. Pat. No. 5,292,791 and U.S. Pat. No. 5,245,084.

Another problem that arises from introduction of organic peroxide crosslinking agents to polyethylene having a high flowability is that the decomposition of these organic peroxides leads to formation of free radicals having low molecular weights, thereby forming substances with low boiling points by capturing hydrogen from polyethylene. Bubbles are formed in the finished article due to these substances with low boiling points, and irritating smell is released therefrom.

To avoid formation of the above bubbles, JP18296/1979 (published) suggests use of a crosslinked polyethylene composition with the introduction of an ethynylated unsaturated peroxide and diene polymer. U.S. Pat. No. 4,267,080 discloses a crosslinking aid for avoiding bubble formation and improving demolding property, which is selected from a group consisting of 1,2-butadiene, triallyl cyanurate (TAC), and/or triallyl isocyanurate (TAIC).

The disclosures of all above-mentioned reference documents are incorporated herein in entirety by references.

So far, no reference document has disclosed such technical content concerning using a crosslinking agent, a crosslinking promoter and a free radical inhibitor simultaneously in a rotational molding polyethylene composition, so as to prevent premature crosslinking during the rotational molding of the polyethylene composition and to avoid bubbles formed in the formed article, because a crosslinking promoter and a free radical inhibitor have opposite effects on crosslinking, their effects may be offset if used together. Meanwhile, use of a free radical inhibitor may result in significant decrease in the degree of crosslinking and the curing (maintaining) speed of the formed article.

However, this invention intends to try a different approach of using a crosslinking agent, a crosslinking promoter and a free radical inhibitor simultaneously in a rotational molding polyethylene composition, by taking advantage of the difference in time and temperature when the crosslinking promoter and the free radical inhibitor take effect, in search of a crosslinked polyethylene composition with improved processability, so as to significantly improve crosslinking retardation time of the crosslinked polyethylene composition, and effectively prevent the crosslinked polyethylene composition from premature crosslinking and avoid formation of bubble in the form article. Meanwhile, use of a high temperature crosslinking agent in combination with a crosslinking promoter and a free radical inhibitor significantly increases the safety process temperature of the crosslinked polyethylene composition.

The crosslinked polyethylene composition comprising a crosslinking agent, a crosslinking promoter and a free radical inhibitor is especially suitable for the manufacture of large rotational molding hollow articles.

SUMMARY OF THE INVENTION

A main object of this invention is to provide a crosslinked polyethylene composition with improved processability. Rotational molding of the composition may avoid premature crosslinking before it becomes compact, and bubbles formed in the molded article; meanwhile, the curing (maintaining) speed of the crosslinked polyethylene composition has been raised, so as to attain the purpose of reducing processing time, increasing productivity, and improving quality of the formed article.

Another object of this invention is to provide a crosslinking aid of the polyethylene composition, capable of improving safety process temperature and/or crosslinking retardation time of the polyethylene composition, in avoidance of formation of bubble in the finished article.

According to the first aspect of this invention, provided is a crosslinked polyethylene composition having improved processability comprising: 100 parts by weight of polyethylene, 0.03-5 parts by weight of crosslinking agent, 0.03-5 parts by weight of crosslinking promoter, and 0.01-1.5 parts by weight of free radical inhibitor, wherein the polyethylene is a copolymer and/or homopolymer containing at least 90 wt. % of vinyl and at least one $C_3$-$C_8$ α-alkenyl, and has a density in the range of 0.920-0.970 g/cm$^3$, a melt index in the range of 2.5-17.5 g/10 min; the crosslinking agent is a peroxide crosslinking agent; the crosslinking promoter is an organic substance containing maleimido, (meth)acrylate group, and/or allyl, and/or a polymer containing more than 50% of vinyl; the free radical inhibitor is an organic antioxidant, hydroquinone and/or a substituted hydroquinone.

Preferably, the above crosslinked polyethylene composition comprises: 100 parts by weight of polyethylene, 0.1-3 parts by weight of crosslinking agent, 0.1-3 parts by weight of crosslinking promoter, and 0.03-1.0 parts by weight of free radical inhibitor; more preferably, the above crosslinked polyethylene composition comprises: 100 parts by weight of polyethylene, 0.3-2 parts by weight of crosslinking agent, 0.3-2 parts by weight of crosslinking promoter, and 0.1-0.8 parts by weight of free radical inhibitor.

Likewise preferably, the above polyethylene further has a density in the range of 0.930-0.965 g/cm$^3$, a melt index in the range of 4-15 g/10 min; more preferably, the above polyethylene further has a density in the range of 0.935-0.960 g/cm$^3$, a melt index in the range of 6-10 g/10 min.

According to the second aspect of this invention, provided is a crosslinking aid of the polyethylene composition, comprising based on the weight of polyethylene: 0.03-5 parts by weight of crosslinking agent, 0.03-5 parts by weight of crosslinking promoter, and 0.01-1.5 parts by weight of free radical inhibitor, wherein the polyethylene is a copolymer and/or homopolymer containing at least 90 wt. % of vinyl and at least one $C_3$-$C_8$ α-alkenyl, and has a density in the range of 0.920-0.970 g/cm$^3$, a melt index in the range of 2.5-17.5 g/10 min; the crosslinking agent is a peroxide crosslinking agent; the crosslinking promoter is an organic substance containing maleimido, (meth)acrylate group, and/or allyl, and/or a polymer containing more than 50% of vinyl; the free radical inhibitor is an organic antioxidant, hydroquinone and/or a substituted hydroquinone.

The above crosslinking aid of the polyethylene composition is used for improving safety process temperature and/or crosslinking retardation time of the polyethylene composition, in avoidance of formation of bubble in the finished article.

According to the first and second aspects of this invention, an example of the polymer containing more than 50% of vinyl is 1,2-polybutadiene.

According to the first and second aspects, preferably, said peroxide crosslinking agents are 1,1-di(tert-butylperoxy)-3,3,5 trimethyl cyclohexane; 2,7-dimethyl-2,7-di(tert-butylperoxy)octadiyne-3,5; 2,7-dimethyl-2,7-di(peroxyethyl carbonate)octadiyne-3,5; 3,6-dimethyl-3,6-di(peroxyethyl carbonate)octyne-4; 3,6-dimethyl-3,6-di(tert-butylperoxy) octyne-4; 2,5-dimethyl-2,5-di(peroxybenzoate)hexyne-3; 2,5-dimethyl-2,5-di(peroxy n-propyl carbonate) hexyne-3; 2,5-dimethyl-2,5-di(peroxy isobutyl carbonate)-hexyne-3; 2,5-dimethyl-2,5-di(peroxyethyl carbonate)hexyne-3; 2,5-dimethyl-2,5-di(alpha-cumyl peroxy) hexyne-3; 2,5-dimethyl-2,5-di(peroxy betachloroethyl carbonate) hexyne-3; 2,5-dimethyl-2,5-di(tert-butylperoxy)hexyne-3 (DTBH); butyl-4,4-di(tert-butylperoxy)valerate; di(2,4-dichlorobenzoyl) peroxide; di(4-methylbenzoyl) peroxide; di (tert-butylperoxy isopropyl)benzene; dibenzoyl peroxide; dicumyl peroxide (DCP); ditert-butyl peroxide; tert-butylcumyl peroxide; tert-butyl peroxy-3,5,5trimethylhexanoate; tert-butylperoxy benzoate; and/or tert-butylperoxy2-ethylhexyl carbonate; and/or derivatives thereof.

According to the first and second aspects of this invention, likewise preferably, said crosslinking promoter is cis-1,2-polybutadiene (1,2-BR); diallyl terephthalate (DATP); divinylbenzene (DVB); triallyl cyanurate (TAC); and/or triallyl cyanurate (TAP); triallyl isocyanurate; or derivatives thereof.

According to the first and second aspects of this invention, preferably still, said substituted hydroquinone is 4,4'-thio-bis(6-tert-butyl-3-methyl-phenol); 2,2'-thio-bis(4-methyl-6-tert-butylphenol); 2,2'-thio-bis(4-methyl-6-tert-butylphenol); 2,2'-thio-bis(4-chloro-6-isopropyl-3-methylphenol), 4,4'-thio-bis(6-tert-butyl-m-cresol); 4,4'-thio-bis(2-methyl-6-tert-butylphenol); 4,4'-thio-bis(2-tert-butyl-5-methylphenol); and mixtures or derivatives thereof.

SPECIFIC EMBODIMENTS

The present invention is further disclosed in detailed by the following reference figures, so as to enable the person skilled in the art to clearly figure out the mechanism and essence of the present invention. However, the description hereinbelow is exemplary only, without any form of limitation to the present invention.

The polyethylene used in this invention can be prepared by polymerization using Z—N catalysts, Cr-based catalysts, and/or metallocene catalysts. Commercially available polyethylene can likewise be used as the polyethylene in this invention.

It is known from the prior art that: under general conditions, the mechanical properties and thermal properties of polyethylene will be greatly improved during crosslinking. The technology of polyethylene crosslinking has long been acknowledged, and quite familiar to those skilled in the art, for example, U.S. Pat. No. 3,079,379 discloses a method for chemical crosslinking of polyethylene, and British Patent No. 1294154 also discloses several improved solution of the method for chemical crosslinking of polyethylene.

In fact, many peroxides that are used in a crosslinked polyethylene composition as crosslinking agents are commercially available. Those stable ones are usually selected as crosslinking agents to facilitate storage and mixing. However, to ensure a proper crosslinking retardation safety, a crosslinking agent should be able to form free substances, such as free radicals, rapidly and easily under a crosslinking temperature.

U.S. Pat. No. 3,214,422, U.S. Pat. No. 3,876,613, U.S. Pat. No. 3,974,114, U.S. Pat. No. 774,564 and EP87210 disclose a variety of conventional peroxide crosslinking agents. All these reference documents are incorporated herein in entirety by references.

Examples of peroxide crosslinking agents including commercially available products are: 1,1-di(tert-butylperoxy)-3,3,5 trimethyl cyclohexane; 2,7-dimethyl-2,7-di(tert-butylperoxy)octadiyne-3,5; 2,7-dimethyl-2,7-di(peroxyethyl carbonate)octadiyne-3,5; 3,6-dimethyl-3,6-di(peroxyethyl carbonate)octyne-4; 3,6-dimethyl-3,6-di(tert-butylperoxy) octyne-4; 2,5-dimethyl-2,5-di(peroxybenzoate)hexyne-3; 2,5-dimethyl-2,5-di(peroxy n-propyl carbonate) hexyne-3; hexyne-3; 2,5-dimethyl-2,5-di(peroxy isobutyl carbonate)-hexyne-3; 2,5-dimethyl-2,5-di(peroxyethyl carbonate)hexyne-3; 2,5-dimethyl-2,5-di(alpha-cumyl peroxy) hexyne-3; 2,5-dimethyl-2,5-di(peroxy betachloroethyl carbonate) hexyne-3; 2,5-dimethyl-2,5-di(tert-butylperoxy)hexyne-3 (DTBH); butyl-4,4-di(tert-butylperoxy)valerate; di(2,4-dichlorobenzoyl) peroxide; di(4-methylbenzoyl) peroxide; di (tert-butylperoxy isopropyl)benzene; dibenzoyl peroxide; dicumyl peroxide (DCP); ditert-butyl peroxide; tert-butylcumyl peroxide; tert-butyl peroxy-3,5,5-trimethylhexanoate; tert-butylperoxy benzoate; and/or tert-butylperoxy2-ethylhexyl carbonate; or derivatives thereof.

However, a universal problem arises when all the above peroxides are employed as crosslinking agents of the polyethylene composition. The range of processing temperature of the crosslinked polyethylene composition is quite narrow. The processing temperature or treating temperature is generally below 150° C., at the same time, the typical crosslinking temperature of the crosslinked polyethylene composition is extremely low as well, generally below 185° C., as a result, the occurrence of premature crosslinking in the polyethylene composition worsens the processability, which not only limits the yield of the extruder or rotational molding die, but also exerts adverse influence on the final properties of the formed article.

Fortunately, through innumerous tests, by making use of the difference in the time and temperature when a crosslinking promoter and a free radical inhibitor take effect, and using a crosslinking agent, together with a crosslinking promoter and a free radical inhibitor in a polyethylene composition, inventors of this invention found a crosslinked polyethylene composition having improved processability, overcoming the defects of premature crosslinking and low degree of crosslinking. The above crosslinked polyethylene composition is especially suitable for rotational molding.

In general, a crosslinking promoter is a multi-function organic substance, with high reactivity over free radicals, use of which as a reactivity additive is conducive to increasing the crosslinking speed of the crosslinking agent. The most frequently used crosslinking promoters include organic substances containing maleimido, (methyl)acrylate group, and/or allyl, and/or polymers containing more than 50% of vinyl, such as 1,2-polybutadiene. Examples of commercially available crosslinking promoters include: cis-1,2-polybutadiene (1,2-BR); diallyl terephthalate (DATP); divinylbenzene (DVB); triallyl cyanurate (TAC); and/or triallyl cyanurate (TAP); triallyl isocyanurate; or derivatives thereof.

The above crosslinking promoter can significantly improve the crosslinking speed of the crosslinking agent in this invention by inhibiting adverse side reactions, wherein adverse side reactions include chain scission and chain disequilibrium.

In this invention, the free radical inhibitor is an organic antioxidant, hydroquinone and/or a substituted hydroquinone, examples thereof include 4,4'-thio-bis(6-tert-butyl-3-methyl-phenol); 2,2'-thio-bis(4-methyl-6-tert-butylphenol); 2,2'-thio-bis(4-methyl-6-tert-butylphenol); 2,2'-thio-bis(4-chloro-6-isopropyl-3-methylphenol), 4,4'-thio-bis(6-tert-butyl-m-cresol); 4,4'-thio-bis(2-methyl-6-tert-butylphenol); 4,4'-thio-bis(2-tert-butyl-5-methylphenol); and mixtures or derivatives thereof.

Generally, a torque value may reflect viscosity of a melt before the crosslinking, and reflect degree of crosslinking after the crosslinking. In this description, "M" represents a torque value tested at the temperature of 200° C.; "$M_{max}$" and "$M_{min}$" represent the maximum and minimum torque values tested at the temperature of 200° C. respectively; $t(M_{max})$ and $t(M_{min})$ represent the time of the maximum and minimum torque values tested at the temperature of 200° C. respectively; gel content is represented by δ torque value, δ(delta) torque value is calculated by "$M_{max}$"–"$M_{min}$"; safety process window (range) is represented by "crosslinking retardation time"; "crosslinking retardation time" is represented by $(M_{min}+2)$; crosslinking speed is represented by $(0.8M_{max}-1.2M_{min})/(t(0.8M_{max})-t(1.2M_{min}))$, Crosslinking Efficiency Index, i.e CEI, is the product of the crosslinking retardation time and the crosslinking speed initiated by available oxygen in a unit, measured by $((0.8M_{max}-1.2M_{min})/(t(0.8M_{max})-t(1.2M_{min})))\times t(M_{min}+2)/$mass of available oxygen in the crosslinking system.

In this description, the density of the polyethylene or polyethylene composition is measured according to ASTM 1505; the melt index of the polyethylene or polyethylene composition is measured according to ASTM D1238.

EXAMPLES

The present invention will be further described by the following detailed exemplary embodiments, but these examples do not set any limit to the present invention.

In the following examples, unless otherwise specified, weight percent (wt. %) is based on the weight of the polyethylene resin.

Example 1

The rheological property of a composition, which is formed by high-density polyethylene (HDPE) containing a peroxide crosslinking agent, a crosslinking promoter and a free radical inhibitor, was measured at the temperature of 200° C.

45 g of HDPE resin particle (DGDA8007, purchased from Shenhua Baotou Coal Chemical Co., Ltd), 0.9 g (2.0 wt. %) of 2,5-dimethyl-2,5-di(tert-butylperoxy)hexyne-3 (DTBH) peroxide crosslinking agent, 0.18 g (0.4 wt. %) of 4,4'-thio-di(2-methyl-6-tert-butylphenol) free radical inhibitor, and 0.09 g (0.2 wt. %) of triallyl isocyanurate (TAIC) crosslinking promoter were added to a HAKKE torque rheometer. The rotational speed of the formed mixture was set at about 40 (rpm), the mixing temperature was set at 200° C. Torque values were measured and recorded in real time during the entire mixing and stirring process, and crosslinking efficiency indexes and δ torque values were calculated. Results were shown in FIG. 5 hereinbelow.

Comparative Example 1-1

The rheological property of a composition, which is formed by high-density polyethylene (HDPE) containing a peroxide crosslinking agent, without a free radical inhibitor and a crosslinking promoter, was measured at the temperature of 200° C.

Figure 1:
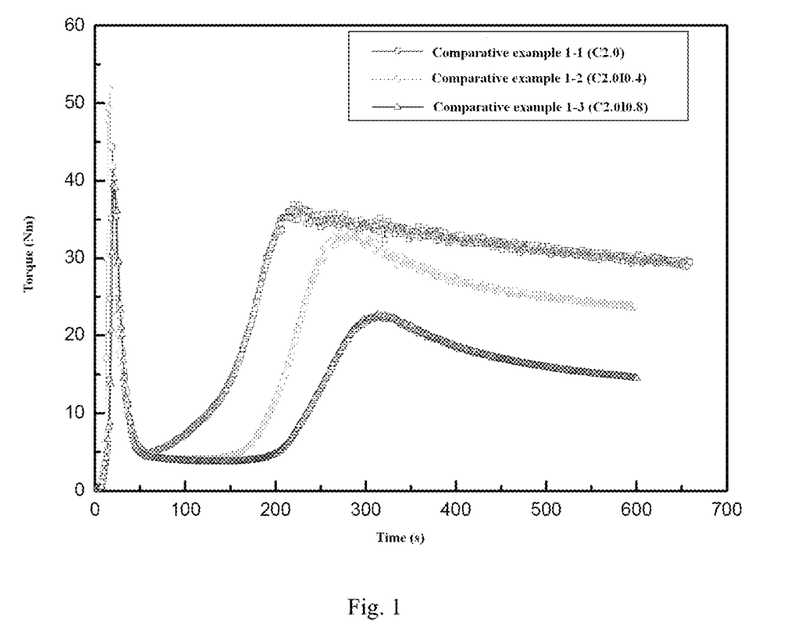
FIG. 1 is a rheogram of the corresponding relation between torque value and time of three samples measured by Haake rheometer at the temperature of 200° C.
Figure 5:
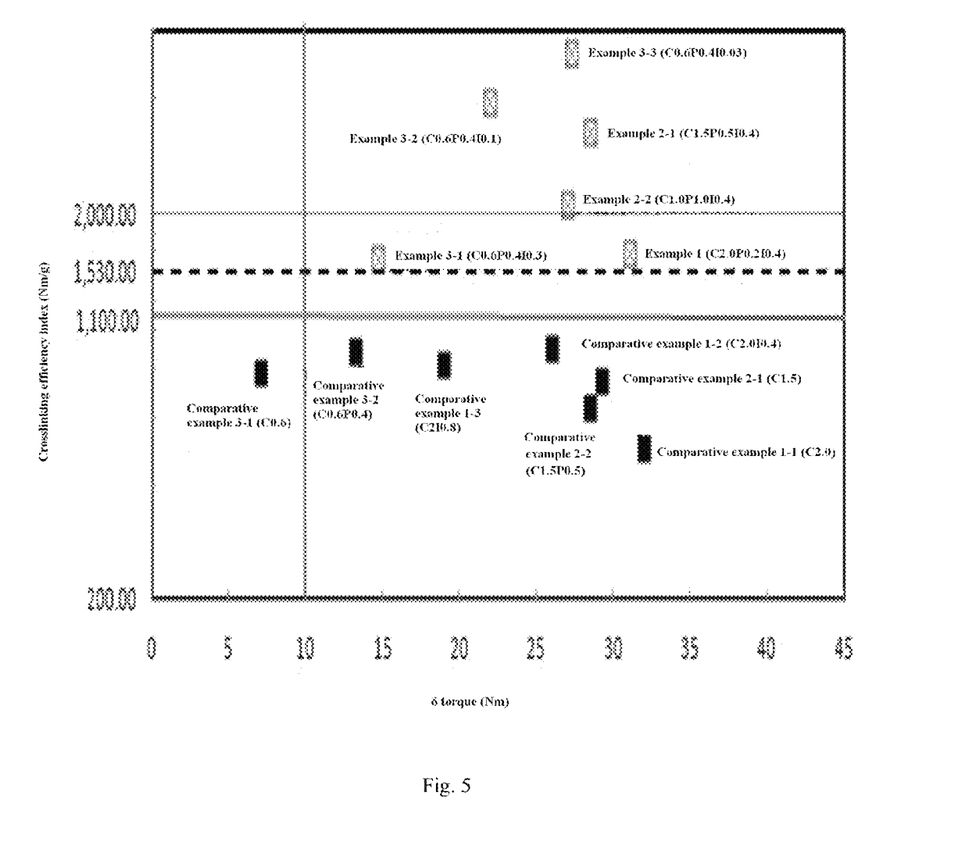
FIG. 5 is a comparison schematic diagram of crosslinking efficiency indexes and δ torque values of various crosslinked polyethylene compositions in Examples 1-3 and Comparative Examples 1-3.

45 g of HDPE resin particle (DGDA8007, purchased from Shenhua Baotou Coal Chemical Co., Ltd), and 0.9 g (2.0 wt. %) of 2,5-dimethyl-2,5-di(tert-butylperoxy)hexyne-3 (DTBH) peroxide crosslinking agent were added to a HAKKE torque rheometer. The rotational speed of the formed mixture was set at about 40 (rpm), the mixing temperature was set at 200° C. Torque values were measured and recorded in real time during the entire mixing and stirring process, and crosslinking efficiency indexes and δ torque values were calculated. Results were shown in Table 1 hereinbelow. FIGS. 1 and 5 were drawn according to the test results.

Comparative Example 1-2

The rheological property of a composition, which is formed by high-density polyethylene (HDPE) containing a peroxide crosslinking agent and a free radical inhibitor, was measured at the temperature of 200° C.

45 g of HDPE resin particle (DGDA8007, purchased from Shenhua Baotou Coal Chemical Co., Ltd), 0.9 g (2.0 wt. %) of 2,5-dimethyl-2,5-di(tert-butylperoxy)hexyne-3 (DTBH) peroxide crosslinking agent, and 0.18 g (0.4 wt. %) of 4,4'-thio-di(2-methyl-6-tert-butylphenol) free radical inhibitor were added to a HAKKE torque rheometer. The rotational speed of the formed mixture was set at about 40 (rpm), the mixing temperature was set at 200° C. Torque values were measured and recorded in real time during the entire mixing and stirring process, and crosslinking efficiency indexes and δ torque values were calculated. Results were shown in Table 1 hereinbelow. FIGS. 1 and 5 were drawn according to the test results.

Comparative Example 1-3

The rheological property of a composition, which is formed by high-density polyethylene (HDPE) containing a peroxide crosslinking agent and a free radical inhibitor, was measured at the temperature of 200° C.

45 g of HDPE resin particle (DGDA8007, purchased from Shenhua Baotou Coal Chemical Co., Ltd), 0.9 g (2.0 wt. %) of 2,5-dimethyl-2,5-di(tert-butylperoxy)hexyne-3 (DTBH) peroxide crosslinking agent, and 0.36 g (0.8 wt. %) of 4,4'-thio-di(2-methyl-6-tert-butylphenol) free radical inhibitor were added to a HAKKE torque rheometer. The rotational speed of the formed mixture was set at about 40 (rpm), the mixing temperature was set at 200° C. Torque values were measured and recorded in real time during the entire mixing and stirring process, and crosslinking efficiency indexes and δ torque values were calculated. Results were shown in Table 1 hereinbelow. FIGS. 1 and 5 were drawn according to the test results.

TABLE 1

| Parameters | Comparative Example 1-1 (C2.0) | Comparative Example 1-2 (C2.0I0.4) | Comparative Example 1-3 (C2.0I0.8) |
|---|---|---|---|
| Peroxide Crosslinking Agent (C) Type | DTBH | DTBH | DTBH |
| Crosslinking Agent (C) Amount (wt. %) | 2.0 | 2.0 | 2.0 |
| Free Radical Inhibitor (I) Type | — | 4,4'-thio-di(2-methyl-6-tert-butylphenol) | 4,4'-thio-di(2-methyl-6-tert-butylphenol) |
| Free Radical Inhibitor (I) Amount (wt. %) | — | 0.4 | 0.8 |
| Pore Number (per cm$^2$) | 20 | 9 | 4 |
| δ Torque Value (Nm) | 32.0 | 29.3 | 19.0 |
| Crosslinking Retardation Time (second) | 97 | 173 | 209 |
| Crosslinking Speed (Nm/s) | 0.220 | 0.209 | 0.170 |
| Surface Profile | Coarse | Smooth | Smooth |

In Table 1 hereinabove, DTBH represents 2,5-dimethyl-2,5-di(tert-butylperoxy)hexyne-3.

It could be clearly observed from Table 1 and FIG. 1 that the addition of the free radical inhibitor greatly reduced formation of bubble in the formed article, which demonstrated that the surface profile of the formed article was notably improved. Meanwhile, the crosslinking retardation time was also significantly increased, which is conducive to prevention of premature crosslinking of the formed composition during the formation. However, addition of only the free radical inhibitor and the peroxide crosslinking agent to the polyethylene composition was detrimental to the δ torque value and the crosslinking speed to some degree.

Comparative Example 1-2-1

The experimental process of Comparative Example 1-2 (C2.0I0.4) was repeated, except for replacing the high-density polyethylene (HDPE) resin particle (DGDA8007, purchased from Shenhua Baotou Coal Chemical Co., Ltd) with low molecular weight polyethylene resin particle (HDPE8920, purchased from Shenhua Baotou Coal Chemical Co., Ltd). The experimental results were shown in FIG. 3.

In this comparative example, as measured by the method according to ASTM D1238, the melt index of the above high-density polyethylene (HDPE) resin particle was 8 g/10 min; and the melt index of the above low molecular weight polyethylene resin particle (HDPE8920) was 22 g/10 min.

Figure 3:
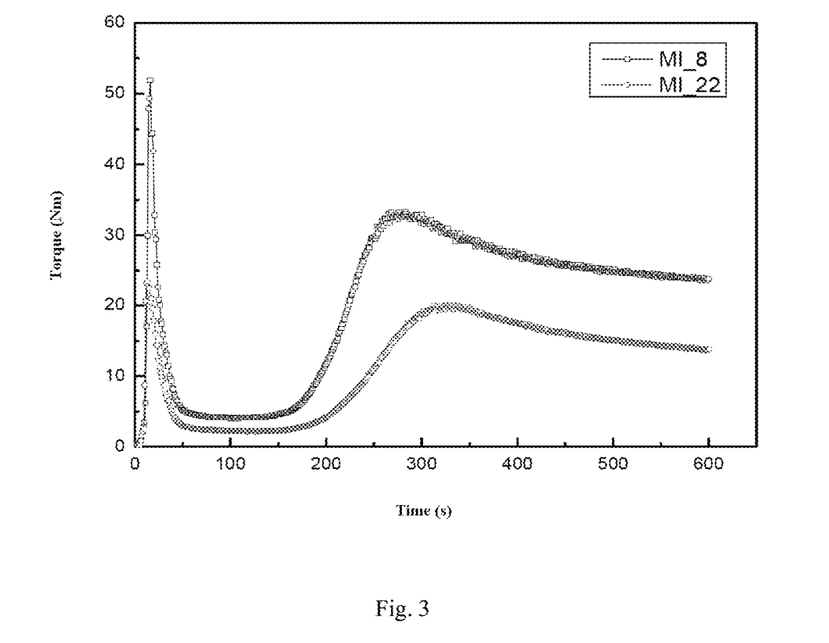
FIG. 3 is a rheogram of the corresponding relation between torque value and time of polyethylene having a high melt index and polyethylene having a low melt index measured by Haake rheometer at the temperature of 200° C.

It could be clearly observed from FIG. 3 that under the same conditions (same crosslinking temperature, crosslinking time, and same amount of the crosslinking agent and the free radical inhibitor, etc), the maximum torque value of the crosslinked polyethylene composition having a low melt index was greater than the maximum torque value of the crosslinked polyethylene composition having a high melt index, which demonstrated that a formed crosslinked polyethylene composition having a low melt index had a degree of crosslinking much higher than that of a formed crosslinked polyethylene composition having a high melt index, thereby greatly contributing to improvement of physical properties of the formed article.

Example 2-1

The rheological property of a composition, which is formed by high-density polyethylene (HDPE) containing a peroxide crosslinking agent, a crosslinking promoter and a free radical inhibitor, was measured at the temperature of 200° C.

45 g of HDPE resin particle (DGDA8007, purchased from Shenhua Baotou Coal Chemical Co., Ltd), 0.675 g (1.5 wt. %) of 2,5-dimethyl-2,5-di(tert-butylperoxy)hexyne-3 (DTBH) peroxide crosslinking agent, 0.18 g (0.4 wt. %) of 4,4'-thio-di(2-methyl-6-tert-butylphenol) free radical inhibitor, and 0.225 g (0.5 wt. %) of triallyl isocyanurate (TAIC) crosslinking promoter were added to a HAKKE torque rheometer. The rotational speed of the formed mixture was set at about 40 (rpm), the mixing temperature was set at 200° C. Torque values were measured and recorded in real time during the entire mixing and stirring process, results thereof were shown in Table 2 hereinbelow. Crosslinking efficiency indexes and δ torque values were calculated, FIGS. 2 and 5 were drawn according to the test results.

Example 2-2

The rheological property of a composition, which is formed by high-density polyethylene (HDPE) containing a peroxide crosslinking agent, a crosslinking promoter and a free radical inhibitor, was measured at the temperature of 200° C.

The experimental process of Example 2-1 was repeated by using 0.45 g (1.0 wt. %) of 2,5-dimethyl-2,5-di(tert-butylperoxy)hexyne-3 (DTBH) peroxide crosslinking agent, 0.18 g (0.4 wt. %) of 4,4'-thio-di(2-methyl-6-tert-butylphenol) free radical inhibitor, and 0.45 g (1.0 wt. %) of triallyl isocyanurate (TAIC) crosslinking promoter, results thereof were shown in Table 2 hereinbelow. Crosslinking efficiency indexes and δ torque values were calculated, FIGS. 2 and 5 were drawn according to the test results.

TABLE 2

| Parameters | Comparative Example 1-2 (C2.0I0.4) | Example 2-1 (C1.5P0.5I0.4) | Example 2-2 (C1.0P1.0I0.4) |
|---|---|---|---|
| Peroxide Crosslinking Agent (C) Type | DTBH | DTBH | DTBH |

TABLE 2-continued

| Parameters | Comparative Example 1-2 (C2.0I0.4) | Example 2-1 (C1.5P0.5I0.4) | Example 2-2 (C1.0P1.0I0.4) |
|---|---|---|---|
| Crosslinking Agent (C) Amount (wt. %) | 2.0 | 1.5 | 1.0 |
| Free Radical Inhibitor (I) Type | 4,4'-thio-di(2-methyl-6-tert-butylphenol) | 4,4'-thio-di(2-methyl-6-tert-butylphenol) | 4,4'-thio-di(2-methyl-6-tert-butylphenol) |
| Free Radical Inhibitor (I) Amount (wt. %) | 0.4 | 0.4 | 0.4 |
| Crosslinking Promoter (P) Type | TAIC | TAIC | TAIC |
| Crosslinking Promoter (P) Amount (wt. %) | 0 | 0.5 | 1.0 |
| δ Torque Value (Nm) | 29.3 | 28.9 | 27.0 |
| Crosslinking Retardation Time (second) | 173 | 176 | 230 |
| Crosslinking Speed (Nm/s) | 0.209 | 0.60 | 0.465 |

In the above Table 2, DTBH has the same meaning as in table 1, while TAIC represents triallyl isocyanate.

Figure 2:
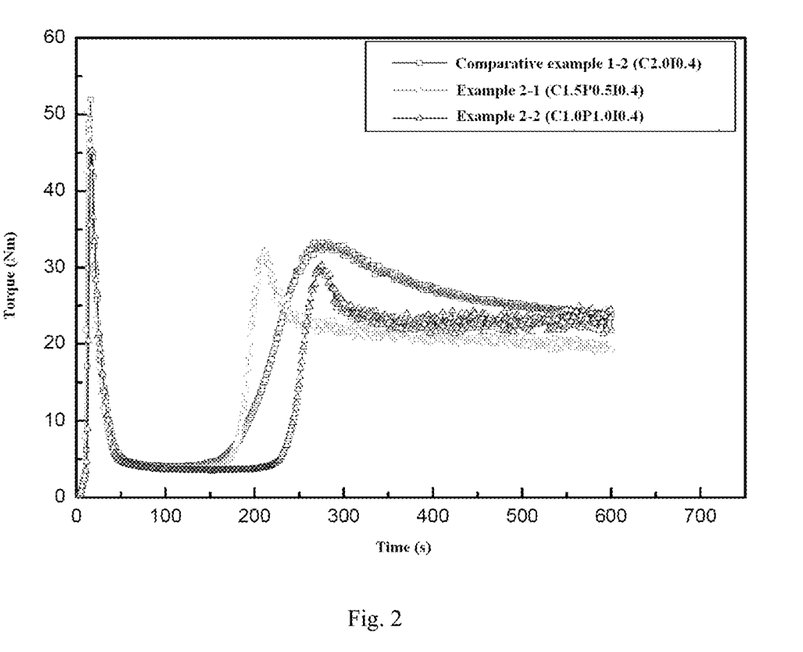
FIG. 2 is a rheogram of the corresponding relation between torque value and time of three samples measured by Haake rheometer at the temperature of 200° C.

It could be clearly observed from Table 2 and FIG. 2 that use of a crosslinking promoter in combination with a free radical inhibitor can reduce the loss of δ torque value of the crosslinked polyethylene composition to negligibly small, and at the same time multiply the crosslinking speed, and greatly increase the crosslinking retardation time, so as to prevent premature crosslinking of the crosslinked polyethylene composition during its formation. Hence, use of a crosslinking promoter in combination with a free radical inhibitor effectively overcomes the defect caused by using a free radical inhibitor alone.

Comparative Example 2-1

The rheological property of a composition, which is formed by high-density polyethylene (HDPE) containing a peroxide crosslinking agent, without a free radical inhibitor and a crosslinking promoter, was measured at the temperature of 200° C.

45 g of HDPE resin particle (DGDA8007, purchased from Shenhua Baotou Coal Chemical Co., Ltd), and 0.675 g (1.5 wt. %) of 2,5-dimethyl-2,5-di(tert-butylperoxy)hexyne-3 (DTBH) peroxide crosslinking agent were added to a HAKKE torque rheometer. The rotational speed of the formed mixture was set at about 40 (rpm), the mixing temperature was set at 200° C. Torque values were measured and recorded in real time during the entire mixing and stirring process, and crosslinking efficiency indexes and δ torque values were calculated. FIG. 5 was drawn according to the test results.

Comparative Example 2-2

The rheological property of a composition, which is formed by high-density polyethylene (HDPE) containing a peroxide crosslinking agent and a crosslinking promoter, without a free radical inhibitor, was measured at the temperature of 200° C.

45 g of HDPE resin particle (DGDA8007, purchased from Shenhua Baotou Coal Chemical Co., Ltd), 0.675 g (1.5 wt. %) of 2,5-dimethyl-2,5-di(tert-butylperoxy)hexyne-3 (DTBH) peroxide crosslinking agent, and 0.225 g (0.5 wt. %) of triallyl isocyanurate (TAIC) crosslinking promoter were added to a HAKKE torque rheometer. The rotational speed of the formed mixture was set at about 40 (rpm), the mixing temperature was set at 200° C. Torque values were measured and recorded in real time during the entire mixing and stirring process, and crosslinking efficiency indexes and δ torque values were calculated. FIG. 5 was drawn according to the test results.

Example 3-1

The rheological property of a composition, which is formed by high-density polyethylene (HDPE) containing a peroxide crosslinking agent, a crosslinking promoter and a free radical inhibitor, was measured at the temperature of 200° C.

45 g of HDPE resin particle (DGDA8007, purchased from Shenhua Baotou Coal Chemical Co., Ltd), 0.27 g (0.6 wt. %) of 2,5-dimethyl-2,5-di(tert-butylperoxy)hexyne-3 (DTBH) peroxide crosslinking agent, 0.135 g (0.3 wt. %) of 4,4'-thio-di(2-methyl-6-tert-butylphenol) free radical inhibitor, and 0.18 g (0.4 wt. %) of triallyl isocyanurate (TAIC) crosslinking promoter were added to a HAKKE torque rheometer. The rotational speed of the formed mixture was set at about 40 (rpm), the mixing temperature was set at 200° C. Torque values were measured and recorded in real time during the entire mixing and stirring process, and crosslinking efficiency indexes and δ torque values were calculated. FIG. 5 was drawn according to the test results.

Example 3-2

The rheological property of a composition, which is formed by high-density polyethylene (HDPE) containing a peroxide crosslinking agent, a crosslinking promoter and a free radical inhibitor, was measured at the temperature of 200° C.

The experimental process of Example 3-1 was repeated, except for changing the amount of 4,4'-thio-di(2-methyl-6-tert-butylphenol) (hTEMPO) free radical inhibitor to 0.045 g (0.1 wt %). Torque values were measured and recorded in real time during the entire mixing and stirring process, and crosslinking efficiency indexes and δ torque values were calculated. FIG. 5 was drawn according to the test results.

Example 3-3

The rheological property of a composition, which is formed by high-density polyethylene (HDPE) containing a peroxide crosslinking agent, a crosslinking promoter and a free radical inhibitor, was measured at the temperature of 200° C.

The experimental process of Example 3-1 was repeated, except for changing the amount of 4,4'-thio-di(2-methyl-6-tert-butylphenol) free radical inhibitor to 0.0135 g (0.03 wt. %). Torque values were measured and recorded in real time during the entire mixing and stirring process, and crosslinking efficiency indexes and δ torque values were calculated. FIG. 5 was drawn according to the test results.

Comparative Example 3-1

The rheological property of a composition, which is formed by high-density polyethylene (HDPE) containing a peroxide crosslinking agent, without a free radical inhibitor and a crosslinking promoter, was measured at the temperature of 200° C.

45 g of HDPE resin particle (DGDA8007, purchased from Shenhua Baotou Coal Chemical Co., Ltd), and 0.27 g (0.6 wt. %) of 2,5-dimethyl-2,5-di(tert-butylperoxy)hexyne-3

(DTBH) peroxide crosslinking agent were added to a HAKKE torque rheometer. The rotational speed of the formed mixture was set at about 40 (rpm), the mixing temperature was set at 200° C. Torque values were measured and recorded in real time during the entire mixing and stirring process, and crosslinking efficiency indexes and δ torque values were calculated. FIG. 5 was drawn according to the test results.

Comparative Example 3-2

The rheological property of a composition, which is formed by high-density polyethylene (HDPE) containing a peroxide crosslinking agent and a crosslinking promoter, without a free radical inhibitor, was measured at the temperature of 200° C.

45 g of HDPE resin particle (DGDA8007, purchased from Shenhua Baotou Coal Chemical Co., Ltd), 0.27 g (0.6 wt. %) of 2,5-dimethyl-2,5-di(tert-butylperoxy)hexyne-3 (DTBH) peroxide crosslinking agent, and 0.18 g (0.4 wt. %) of triallyl isocyanurate (TAIC) crosslinking promoter were added to a HAKKE torque rheometer. The rotational speed of the formed mixture was set at about 40 (rpm), the mixing temperature was set at 200° C. Torque values were measured and recorded in real time during the entire mixing and stirring process, and crosslinking efficiency indexes and δ torque values were calculated. FIG. 5 was drawn according to the test results.

FIG. 5 is a comparison schematic diagram of crosslinking efficiency indexes and δ torque values of various crosslinked polyethylene compositions in Examples 1-3 and Comparative Examples 1-3. It could be clearly observed from FIG. 5 that all the crosslinked polyethylene compositions in Example 1-3 had a crosslinking efficiency index greater than 1100 Nm/g, and a δ torque value greater than 10 Nm at the temperature of 200° C., correspondingly, all the crosslinked polyethylene compositions in Comparative Example 1-3 of the prior art had a crosslinking efficiency index less than 1100 Nmg/g, even though their δ torque values were mostly greatly than 10 Nm. It was shown that the processability, particularly, rotational molding processability of the crosslinked polyethylene composition in this invention was significantly improved.

Example 4

A high-density polyethylene containing a peroxide crosslinking agent, a crosslinking promoter and a free radical inhibitor was subjected to rotational molding, and relevant properties of the formed composition and the formed article were measured.

500 g of HDPE resin particle (DGDA8007, purchased from Shenhua Baotou Coal Chemical Co., Ltd), 5.0 g (1.0 wt. %) of 2,5-dimethyl-2,5-di(tert-butylperoxy)hexyne-3 (DTBH) peroxide crosslinking agent, 5.0 g (1 wt. %) of triallyl isocyanurate (TAIC) crosslinking promoter, and 2.0 g (0.4 wt. %) of 4,4'-thio-di(2-methyl-6-tert-butylphenol) free radical inhibitor were added to a HAKKE extruder, a mixture thereof was extruded by a twin-screw extruder at the temperature of 150° C., followed by cooling in water and granulating, wherein the extrusion speed and the feeding speed were set at 12 kg/h, and the screw rotational speed was set at about 90 (rpm). The above mixture was retained in the extruder for about 2.5 min.

The HDPE resin particle extruded and granulated from the extruder were grinded and can pass through a 35-mesh sieve, thereby forming powders for future use.

150 g of the above powders were placed in a rotational molding die to form a hollow cube with a wall thickness of 4 mm. The die was heated to 200° C., and maintained at 200° C. for 15 min. The rotational speed of the die was about 40 (rpm). After a composition was formed, the die and the formed article therein were cooled to room temperature, and the formed article was withdrawn from the die.

Only a few pinholes could be observed from the surface of the formed article, which demonstrated that there was few or basically no bubble in the composition when molding. Relevant properties of the formed composition and the formed article were shown in Table 3 hereinbelow.

Comparative Example 4

The experimental process of Example 4 was repeated, except for replacing the high-density polyethylene (HDPE) resin particle (DGDA8007, purchased from Shenhua Baotou Coal Chemical Co., Ltd) with low molecular weight polyethylene resin particle (LLDPE6101, purchased from Shenhua Baotou Coal Chemical Co., Ltd). The experimental results were also shown in Table 3 hereinbelow.

TABLE 3

| Parameters | Example 4 | Comparative Example 4 |
| --- | --- | --- |
| Type of Polyethylene | High-density Polyethylene (HDPE) | Linear Low-density Polyethylene (LLDPE) |
| Melt Index (g/10 min) | 8 | 22 |
| Density (g/cm$^3$) | 0.963 | 0.928 |
| Peroxide Crosslinking Agent (C) Amount, wt. % | 1.0 | 1.0 |
| Free Radical Inhibitor (I) Amount (wt. %) | 0.4 | 0.4 |
| Crosslinking Promoter (P) Amount wt. % | 1.0 | 1.0 |
| Vicat Soften Temperature (VST) ° C. | 126 | 116 |

It could be observed from Table 3 that a high-density polyethylene had a Vicat soften temperature (VST) higher than that of a linear low density polyethylene composition, which improved the size stability, and reduced thermal deformation of a crosslinked article prepared by the high-density polyethylene composition, namely, the thermal deformation resistance was improved, the rigidity was increased, and the modulus was enlarged. A large chemical vessel prepared by a high-density polyethylene composition might have an even better chemical erosion resistance.

Example 5

The rheological property of storage modulus G'(Pa) of a composition, which is formed by high-density polyethylene (HDPE) containing a peroxide crosslinking agent, a crosslinking promoter and a free radical inhibitor, was measured at the temperature of 200° C.

A composition of 500 g of HDPE resin particle (DGDA8007, purchased from Shenhua Baotou Coal Chemical Co., Ltd), 5.00 g (1.0 wt. %) of 2,5-dimethyl-2,5-di(tert-butylperoxy)hexyne-3 (DTBH) peroxide crosslinking agent, 2.5 g (0.5 wt. %) of triallyl isocyanurate (TAIC) crosslinking promoter, and 1.5 g (0.3 wt. %) of 4,4'-thio-di(2-methyl-6-tert-butylphenol) free radical inhibitor was added to a HAKKE twin-screw extruder.

The operating temperature of the twin-screw extruder was set at 135° C. in the first stage to the third stage, set at 140° C. in the fourth stage to the sixth stage, set at 145° C. in the seventh stage to the ninth stage, and set at 140° C. in the tenth stage. The feeding speed was 4.00%, and the screw rotational speed was 90 rpm.

The above mixed composition was subject to injection molding in a micro injection molding machine into a disc-shaped sample with a diameter of 20 mm, and a thickness of 1.5 mm, for use in rotational rheological test. Conditions of injection molding were: a melt temperature of 150° C., an injection molding pressure of 60 bar, a die temperature of 50° C., maintaining for 10 s at 10 bar.

The sample obtained hereinabove was subjected to a test on MARS III (rotational rheometer). The test method is a combination of temperature scan and time scan. To be specific, the dynamic oscillation temperature scan controlled by stress was performed within a temperature range of 150-200° C., with the strain of 3%, and the scan frequency of 1 rad/s; and then the time scan controlled by stress was performed at the temperature of 200° C., with the strain and frequency remaining unchanged. The change of storage modulus (G'(Pa)) over time was recorded in real time during the experiment.

Comparative Example 5

The rheological property of storage modulus G'(Pa) of a composition, which is formed by high-density polyethylene (HDPE) containing a peroxide crosslinking agent and a crosslinking promoter, without a free radical inhibitor, was measured at the temperature of 200° C.

The experimental process of Example 5 was repeated except for omitting the addition of a free radical inhibitor (4,4'-thio-di(2-methyl-6-tert-butylphenol) to the composition. The experimental results were likewise shown in FIG. 4.

Figure 4:
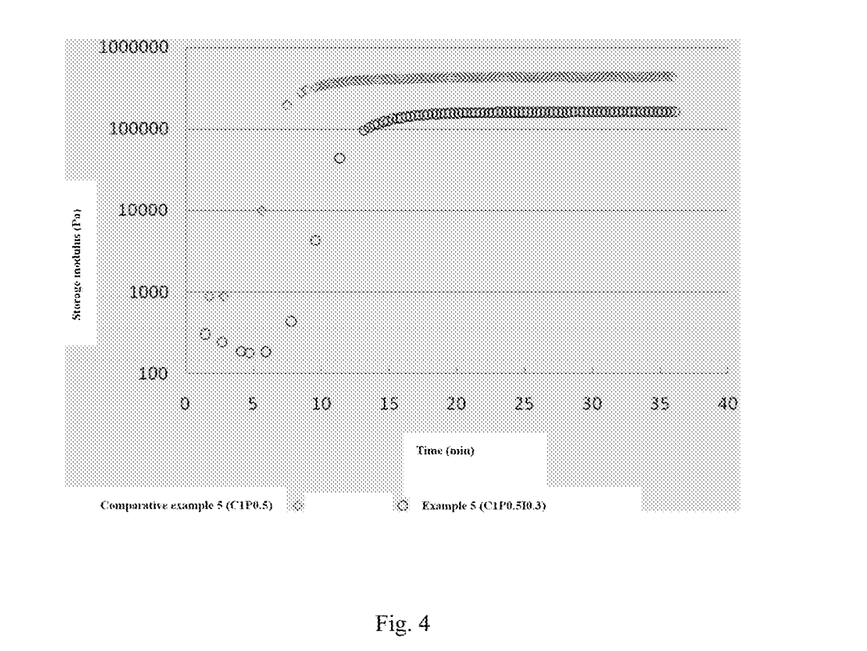
FIG. 4 is a curve of the corresponding relation between storage modulus G'(Pa) and time of the crosslinked polyethylene compositions in Example 5 and Comparative Example 5 at the temperature of 200° C.

It could be clearly observed from FIG. 4 that adding a free radical inhibitor (4,4'-thio-di(2-methyl-6-tert-butylphenol) to a high-density polyethylene composition significantly improved the crosslinking retardation time of the composition, thereby effectively preventing premature crosslinking of the crosslinked polyethylene composition during the formation, greatly improving the processability of the crosslinked polyethylene composition during the formation, but causing a certain damage to the storage modulus (G'(Pa)).

Example 6

The surface profile quality of the formed article prepared by the polyethylene composition in Example 5 was tested.

The polyethylene composition of Example 5 was placed in a die for rotational molding, 30 g for each feeding. The die filled with the formed composition was fed to a furnace by a shuttle feeder for rotational molding, with the furnace temperature set at 250° C. The die was retained in the furnace for 20 min. The die employed was a φ15 cm×20 cm stainless cylindrical die, which was made into a cylindrical article having a wall thickness of 3.0 mm, wherein a ratio of the major rotational speed, which was set at 60 rpm, to the minor rotational speed was 5:1. The die and the article formed therein were subjected to forced cooling for 15 min by air.

Figure 6:
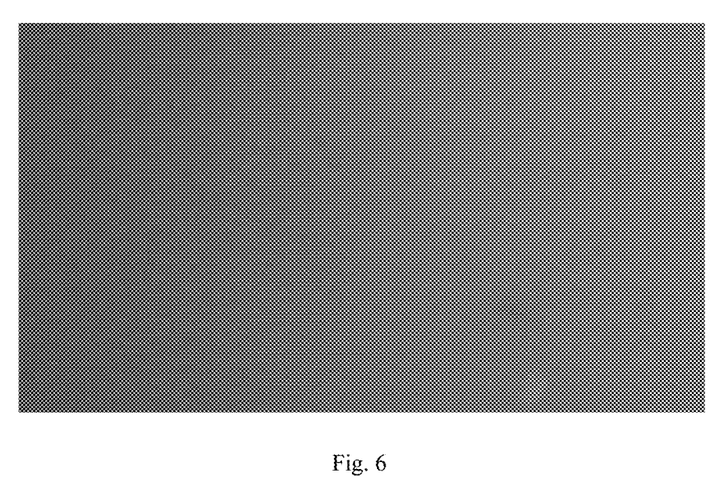
FIG. 6 is the surface profile of the article formed by the crosslinked polyethylene composition of Example 5.

The profile of a formed article resulted therefrom was shown in FIG. 6.

Comparative Example 6

The surface profile quality of the formed article prepared by the polyethylene composition in Comparative Example 5 was tested.

The experimental process of Example 6 was repeated except for replacing the polyethylene composition in Example 5 with the polyethylene composition in Comparative Example 5.

Figure 7:
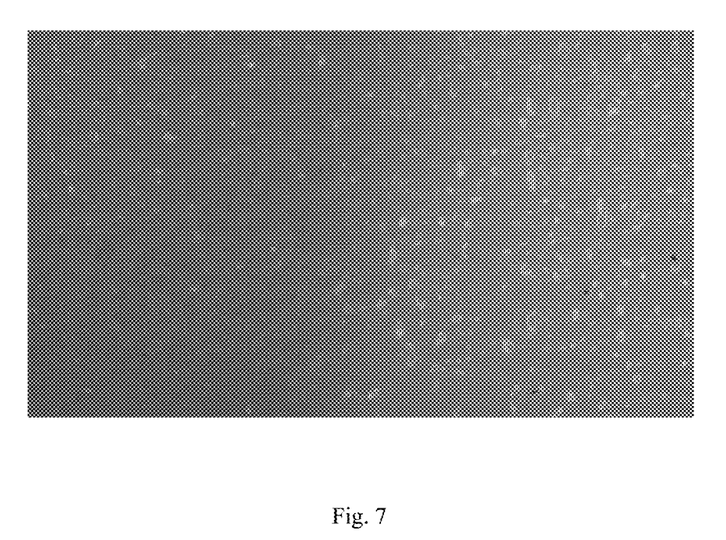
FIG. 7 is the surface profile of the article formed by the crosslinked polyethylene composition of Comparative Example 5.

The profile of a formed article resulted therefrom was shown in FIG. 7.

It could be observed by comparing FIG. 6 and FIG. 7 that the surface as shown by FIG. 6 was smooth and homogeneous, without any defect that could be observed macroscopically. However, the surface as shown by FIG. 7 was coarse, with the presence of a large number of gel granules and/or pinholes, which demonstrated that a crosslinked polyethylene composition with the addition of a free radical inhibitor was free from premature crosslinking during the formation, hence, the composition has a good processability, and the formed article also has excellent physical properties and profile. On the contrary, premature crosslinking had happened to a crosslinked polyethylene composition without the addition of a free radical inhibitor during its formation, which led to a worse flowability of the composition when molding, and thus the composition had a poor processability, and the formed article also had deteriorated physical properties and profile.

Example 7

The profile of the surface and the neighboring area of a copper insert in the article, which was formed by the crosslinked polyethylene composition containing a peroxide crosslinking agent, a crosslinking promoter and a free radical inhibitor, was measured.

A specific metal insert is usually required to be placed in the formed articles according to their functions and uses. The fastness of the metal insert in the formed article, or the adhesion strength between the metal insert and the formed article is also an important parameter for the processability of the formed composition and the physical properties of the formed article. This example evaluated this parameter by measuring the profile of the surface and the neighboring area of a copper insert in the article, which was formed by the crosslinked polyethylene composition containing a peroxide crosslinking agent, a crosslinking promoter and a free radical inhibitor.

Figure 8:
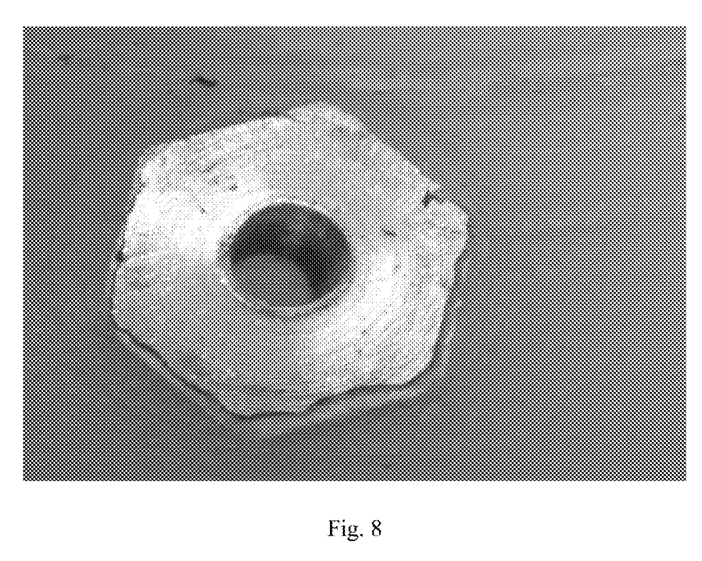
FIG. 8 is the profile of the surface and the neighboring area of a copper insert in the finished article of the crosslinked polyethylene composition of Example 5.

The experimental process of Example 6 was repeated except for placing the copper insert as shown in FIG. 8 in the crosslinked polyethylene composition of Example 5 in the course of rotational molding. The profile of the surface and the neighboring area of the resulted copper insert in the article formed by the crosslinked polyethylene composition was shown in FIG. 8.

Comparative Example 7

The profile of the surface and the neighboring area of a copper insert in the article, which was formed by the crosslinked polyethylene composition containing a peroxide crosslinking agent and a crosslinking promoter, without a free radical inhibitor, was measured.

The experimental process of Example 7 was repeated except for replacing the crosslinked polyethylene composition of Example 5 with the crosslinked polyethylene composition of Comparative Example 5. The profile of the surface and the neighboring area of the resulted copper insert in the article formed by the crosslinked polyethylene composition was shown in FIG. 9.

Figure 9:
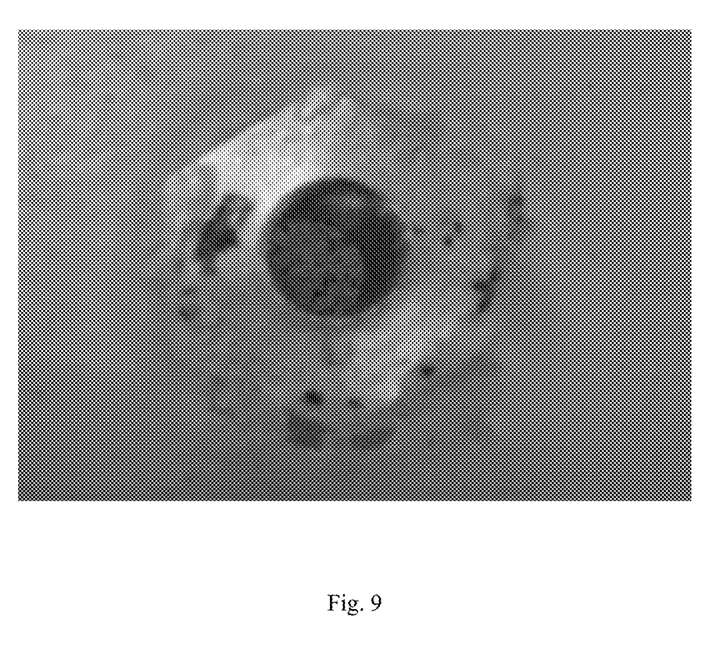
FIG. 9 is the profile of the surface and the neighboring area of a copper insert in the finished article of the crosslinked polyethylene composition of Comparative Example 5.

It could be noted by comparing FIG. 8 with FIG. 9: in FIG. 8, the interface between the copper insert and the crosslinked polyethylene composition containing the free radical inhibitor was neat and compact, without pores and holes, which demonstrated that the polyethylene composition containing the free radical inhibitor was free from premature crosslinking during its formation. Owning to a good flowability, the composition could be sufficiently contacted with the copper insert, which enabled the copper insert to securely adhere to the formed article, and the adhesion strength was great. On the contrary, in FIG. 9, the interface between the copper insert and the free radical inhibitor-free crosslinked polyethylene composition was coarse and loose, with a large number of pores and holes (the dark parts in the drawing), which demonstrated that the free radical inhibitor-free crosslinked polyethylene composition had a poor flowability during its formation, disenabling it to sufficiently contact with the copper insert. It implied that premature crosslinking happened to the free radical inhibitor-free crosslinked polyethylene composition, causing a larger viscosity and a poorer flowability of the composition, so that it could not be contacted sufficiently with the copper insert, causing the formation of a plurality of pores and/or holes on the interface. As a result, the adhesion between the copper insert and the formed article was very poor, and the adhesion strength was lower.

The terms and expression manners in the specification are merely used descriptively but not restrictively, and there is no intention to exclude any equivalents of the represented and described features or constituents thereof when using these terms and modes of expression.

Although several embodiments of the present invention have been represented and described, yet the present invention is not limited to the embodiments as described therein. On the contrary, the person skilled in the art should be aware of any modification and improvement to these embodiments without going against the principle and spirit of the present invention, and the protection scope of the present invention is determined by the attached claims and equivalents thereof.

The invention claimed is:

1. A crosslinked polyethylene composition wherein the composition is prepared by combining: 100 parts by weight of polyethylene, 0.03-5 parts by weight of crosslinking agent, 0.03-5 parts by weight of crosslinking promoter, and 0.01-1.5 parts by weight of free radical inhibitor, wherein the polyethylene is a copolymer and/or homopolymer containing at least 90 wt. % of vinyl and at least one $C_3$-$C_8$ α-alkenyl, has a density in the range of 0.935-0.960 g/cm$^3$, and a melt index in the range of 2.5-17.5 g/10 min at 190° C./2.16 kg; the crosslinking agent is a peroxide crosslinking agent; the crosslinking promoter is an organic substance containing maleimido, (meth)acrylate group, and/or allyl, and/or a polymer containing more than 50% of vinyl; the free radical inhibitor is hydroquinone and/or a substituted hydroquinone selected from the group consisting of 4,4'-thio-bis(6-tert-butyl-3-methyl-phenol), 2,2'-thio-bis(4-methyl-6-tert-butylphenol), 2,2'-thio-bis(4-chloro-6-isopropyl-3-methylphenol), 4,4'-thio-bis(6-tert-butyl-m-cresol), 4,4'-thio-bis(2-methyl-6-tert-butylphenol), 4,4'-thio-bis(2-tert-butyl-5-methylphenol), and mixtures thereof, and the crosslinked polyethylene composition has a crosslinking efficiency index of more than 1,100 Nm/g and a δ torque value of more than 10 Nm at the temperature of 200° C. and 40 rpm.

2. The crosslinked polyethylene composition according to claim 1, wherein the composition is prepared by combining: 100 parts by weight of polyethylene, 0.1-3 parts by weight of crosslinking agent, 0.1-3 parts by weight of crosslinking promoter, and 0.03-1.0 parts by weight of free radical inhibitor.

3. The crosslinked polyethylene composition according to claim 2, wherein the composition is prepared by combining: 100 parts by weight of polyethylene, 0.3-2 parts by weight of crosslinking agent, 0.3-2 parts by weight of crosslinking promoter, and 0.1-0.8 parts by weight of free radical inhibitor.

4. The crosslinked polyethylene composition according to claim 1, wherein the polyethylene has a melt index in the range of 4-15 g/10 min at 190° C./2.16 kg.

5. The crosslinked polyethylene composition according to claim 1, wherein the polyethylene has a melt index in the range of 6-10 g/10 min at 190° C./2.16 kg.

6. The crosslinked polyethylene composition according to claim 1, wherein the polymer containing more than 50% of vinyl is 1,2-polybutadiene.

7. The crosslinked polyethylene composition according to claim 1, wherein said peroxide crosslinking agent is selected from the group consisting of 1,1-di(tert-butylperoxy)-3,3,5 trimethyl cyclohexane; 2,7-dimethyl-2,7-di(tert-butylperoxy)octadiyne-3,5; 2,7-dimethyl-2,7-di(peroxyethyl carbonate)octadiyne-3,5; 3,6-dimethyl-3,6-di(peroxyethyl carbonate)octyne-4; 3,6-dimethyl-3,6-di(tert-butylperoxy)octyne-4; 2,5-dimethyl-2,5-di(peroxybenzoate)hexyne-3; 2,5-dimethyl-2,5-di(peroxy n-propyl carbonate) hexyne-3; 2,5-dimethyl-2,5-di(peroxy isobutyl carbonate)-hexyne-3; 2,5-dimethyl-2,5-di(peroxyethyl carbonate)hexyne-3; 2,5-dimethyl-2,5-di(alpha-cumyl peroxy) hexyne-3; 2,5-dimethyl-2,5-di(peroxy betachloroethyl carbonate) hexyne-3; 2,5-dimethyl-2,5-di(tert-butylperoxy)hexyne-3 (DTBH); butyl-4,4-di(tert-butylperoxy)valerate; di(2,4-dichlorobenzoyl) peroxide; di(4-methylbenzoyl) peroxide; di (tert-butylperoxy isopropyl)benzene; dibenzoyl peroxide; dicumyl peroxide (DCP); ditert-butyl peroxide; tert-butylcumyl peroxide; tert-butyl peroxy-3,5,5-trimethylhexanoate; tert-butylperoxy benzoate; and tert-butylperoxy-2-ethylhexyl carbonate.

8. The crosslinked polyethylene composition according to claim 1, wherein said crosslinking promoter is selected from the group consisting of cis-1,2-polybutadiene (1,2-BR); diallyl terephthalate (DATP); triallyl cyanurate (TAC); and triallyl isocyanurate (TAIC).

* * * * *